(12) United States Patent
Matsunaga

(10) Patent No.: US 9,412,190 B2
(45) Date of Patent: Aug. 9, 2016

(54) IMAGE DISPLAY SYSTEM, IMAGE DISPLAY APPARATUS, IMAGE DISPLAY METHOD, AND NON-TRANSITORY STORAGE MEDIUM ENCODED WITH COMPUTER READABLE PROGRAM

(71) Applicant: NINTENDO CO., LTD., Kyoto (JP)

(72) Inventor: Hiroshi Matsunaga, Kyoto (JP)

(73) Assignee: NINTENDO CO., LTD., Kyoto-shi (JP)

( * ) Notice: Subject to any disclaimer, the term of this patent is extended or adjusted under 35 U.S.C. 154(b) by 0 days.

(21) Appl. No.: 14/841,962

(22) Filed: Sep. 1, 2015

(65) Prior Publication Data
US 2016/0189411 A1    Jun. 30, 2016

(30) Foreign Application Priority Data
Dec. 26, 2014 (JP) .................................. 2014-264352

(51) Int. Cl.
| | |
|---|---|
| *G06T 11/60* | (2006.01) |
| *G06T 15/50* | (2011.01) |
| *H04N 5/225* | (2006.01) |
| *G09G 5/14* | (2006.01) |
| *G06F 3/00* | (2006.01) |
| *G06F 3/041* | (2006.01) |

(52) U.S. Cl.
CPC .............. *G06T 11/60* (2013.01); *G06F 3/0412* (2013.01); *G06T 15/50* (2013.01); *G09G 5/14* (2013.01); *H04N 5/225* (2013.01); *G06T 2207/20221* (2013.01); *G09G 2340/125* (2013.01)

(58) Field of Classification Search
None
See application file for complete search history.

(56) References Cited

U.S. PATENT DOCUMENTS

| | | | | |
|---|---|---|---|---|
| 4,011,571 A | * | 3/1977 | Okuzawa ............... | G03B 13/02 396/291 |
| 7,391,445 B2 | * | 6/2008 | Herberger ............ | G06T 1/0007 348/239 |
| 7,515,816 B2 | * | 4/2009 | Onozawa ............... | G02B 7/282 382/106 |
| 7,868,889 B2 | * | 1/2011 | Azuma .................... | A63F 13/10 345/473 |
| 8,698,902 B2 | * | 4/2014 | Kawamoto ........... | G06T 19/006 348/207.1 |
| 2004/0174455 A1 | * | 9/2004 | Soga ..................... | G03B 13/36 348/348 |
| 2005/0225566 A1 | * | 10/2005 | Kojo ...................... | G06T 13/80 345/629 |
| 2013/0171601 A1 | * | 7/2013 | Yuasa et al. ........... | A61B 5/1114 434/258 |
| 2015/0009336 A1 | * | 1/2015 | Wang ....................... | H04N 5/33 348/165 |
| 2015/0229840 A1 | * | 8/2015 | Sawai et al. ........... | G06T 3/4038 348/36 |

FOREIGN PATENT DOCUMENTS

JP     2001-299975     10/2001

* cited by examiner

*Primary Examiner* — William Perkey
(74) *Attorney, Agent, or Firm* — Nixon & Vanderhye P.C.

(57) ABSTRACT

An image display system includes a display unit, a shooting unit configured to shoot an image of a subject, a specifying unit configured to specify a position of the subject in the image shot by the shooting unit, and a display control unit configured to have the display unit display the shot image and a predetermined comparison image. The display control unit is configured to have the comparison image displayed at a position where the comparison image is superimposed on the subject in the shot image, based on the specified position of the subject.

24 Claims, 14 Drawing Sheets

IMAGE DISPLAY SYSTEM, IMAGE DISPLAY APPARATUS, IMAGE DISPLAY METHOD, AND NON-TRANSITORY STORAGE MEDIUM ENCODED WITH COMPUTER READABLE PROGRAM

This nonprovisional application is based on Japanese Patent Application No. 2014-264352 filed with the Japan Patent Office on Dec. 26, 2014, the entire contents of which are hereby incorporated by reference.

FIELD

The present disclosure relates to an image display system and an image display apparatus displaying another image together with a shot image of a user, an image display method for controlling display in displaying another image together with a shot image of a user, and a non-transitory storage medium encoded with a computer readable program for implementing such control in an image display apparatus.

BACKGROUND AND SUMMARY

Various techniques for shooting a user such as a player of a game machine and displaying the shot image together with another image have conventionally been proposed. For example, a somesthetic apparatus displaying a picked-up image of a player picked up by image pick-up means and a motion picture of a prescribed character in prescribed divided regions has been proposed. The somesthetic apparatus divides a display region of display means in a plurality of regions, displays the picked-up image in the prescribed divided region, and displays the motion picture in another divided region.

In the apparatus as above, in some cases, the displayed motion picture should be compared with the shot image. In particular in such a case, a user should watch two images displayed on the display means for comparison, and the user has felt bothersome.

According to the present disclosure, a shot image and another image are displayed in such a manner that comparison therebetween is easy.

An exemplary embodiment provides an image display system which includes a display unit, a shooting unit configured to shoot an image of a subject, a specifying unit configured to specify a position of the subject in the image shot by the shooting unit, and a display control unit configured to have the display unit display the shot image and a predetermined comparison image. The display control unit has the comparison image displayed at a position where the comparison image is superimposed on the subject in the shot image, based on the specified position of the subject.

In the exemplary embodiment, the display control unit is configured to vary a size of the comparison image based on a state of the subject in the shot image.

In the exemplary embodiment, the specifying unit is configured to specify a size of the subject in the shot image. The display control unit is configured to determine a size of the comparison image based on the size of the subject in the shot image.

In the exemplary embodiment, the display control unit is configured to set the size of the comparison image such that the comparison image increases in size as the subject in the shot image increases in size.

In the exemplary embodiment, the specifying unit is configured to specify a plurality of feature points in the shot image. The display control unit is configured to set the size of the comparison image based on the plurality of feature points.

In the exemplary embodiment, the shooting unit is configured to repeatedly shoot an image of the subject. The specifying unit is configured to specify a position of the subject in each of the images repeatedly shot by the shooting unit. The display control unit is configured to have the display unit display the images repeatedly shot by the shooting unit and the comparison image.

In the exemplary embodiment, the specifying unit is configured to specify a position of a face of the subject in the shot image. The display control unit is configured to have the comparison image displayed such that a face in the comparison image is displayed at a position where the face in the comparison image is superimposed on the face of the subject in the shot image, based on the specified position of the face of the subject.

In the exemplary embodiment, the specifying unit is configured to specify a feature point in the face of the subject in the shot image. The display control unit is configured to have the comparison image displayed such that the face in the comparison image is displayed at a position where the face in the comparison image is superimposed on the face of the subject in the shot image, based on the feature point.

In the exemplary embodiment, the shooting unit and the display unit are provided in a common housing.

In the exemplary embodiment, the shooting unit is provided on the same surface where a display surface of the display unit is located.

In the exemplary embodiment, the housing forms a portable terminal.

In the exemplary embodiment, the comparison image is a silhouette image representing a region of the comparison image.

In the exemplary embodiment, the display control unit is further configured to have a reference image displayed, which is an image corresponding to the comparison image.

In the exemplary embodiment, the reference image is a three-dimensional image.

In the exemplary embodiment, the reference image is displayed independently of the shot image.

In the exemplary embodiment, the image display system further includes a stationary display apparatus for displaying the reference image.

In the exemplary embodiment, the specifying unit is further configured to specify a portion representing the subject in the shot image. The image display system further includes a determination unit which determines a degree of matching between a portion representing the subject in the shot image and the comparison image.

In the exemplary embodiment, the determination unit is configured to calculate the degree based on an area of matching between the portion representing the subject in the shot image and the comparison image.

In the exemplary embodiment, the determination unit is configured to output information based on a difference between the comparison image and the portion representing the subject in the shot image when the degree is lower than a predetermined value.

In the exemplary embodiment, the display control unit is configured to determine a color of the comparison image in accordance with a state of the shot image.

In the exemplary embodiment, the display control unit is configured to determine the color of the comparison image in accordance with brightness of the shot image.

An exemplary embodiment provides an image display apparatus which includes a display unit, a shooting unit configured to shoot an image of a subject, a specifying unit configured to specify a position of the subject in the image shot by the shooting unit, and a display control unit configured to have the display unit display the shot image and a predetermined comparison image. The comparison image is displayed at a position in the shot image where the comparison image is superimposed on the subject.

An exemplary embodiment provides an image display method including the steps of shooting an image of a subject, specifying a position of the subject in the shot image, and displaying the shot image and a predetermined comparison image. The comparison image is arranged at a position in the shot image where the comparison image is superimposed on the subject.

An exemplary embodiment provides a non-transitory storage medium encoded with a computer readable program executed by a computer controlling display of an image on a display unit. The program causes the computer to perform the steps of shooting an image of a subject, specifying a position of the subject in the shot image, and displaying the shot image and a predetermined comparison image. The comparison image is arranged at a position in the shot image where the comparison image is superimposed on the subject.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
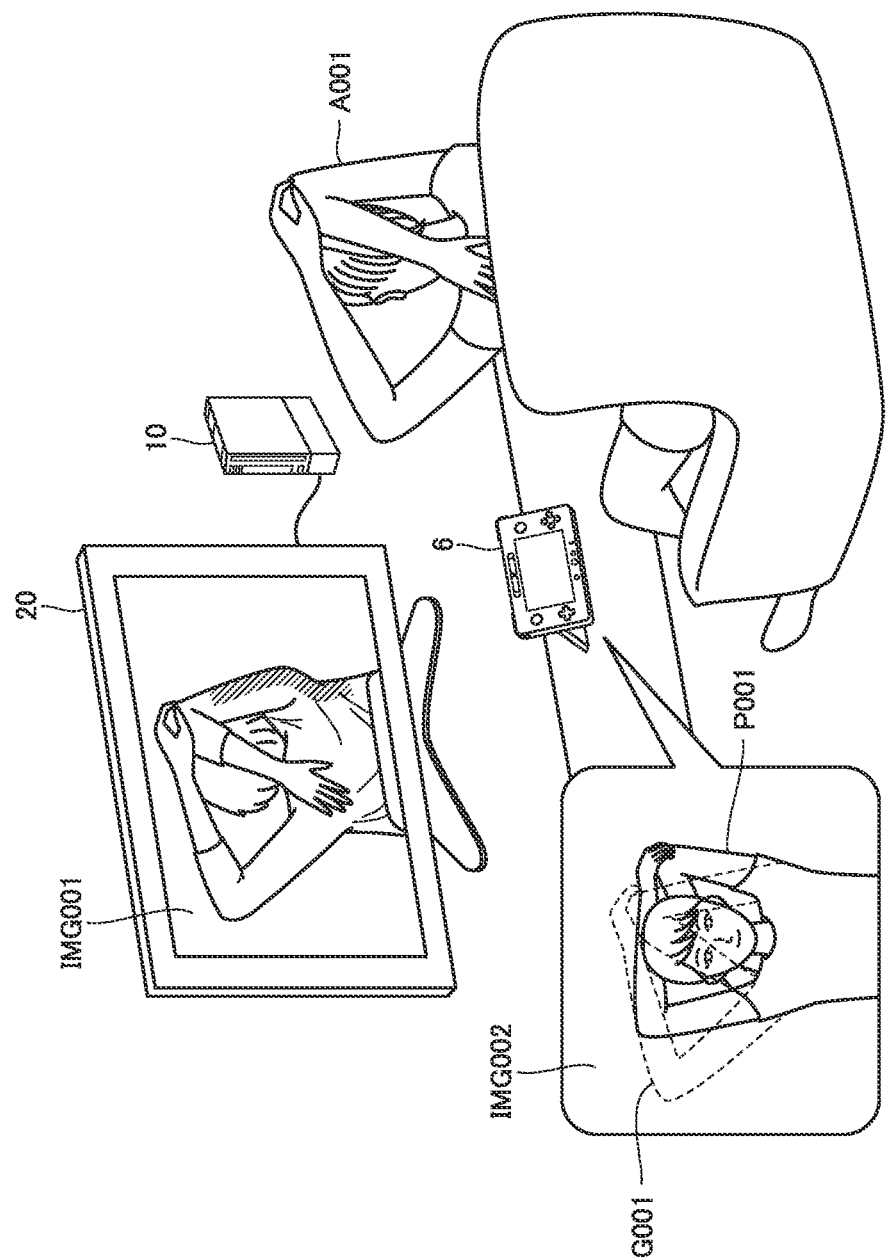
FIG. 1 shows an exemplary illustrative non-limiting schematic diagram illustrating overview of display control in an image display system in the present embodiment.
Figure 2:
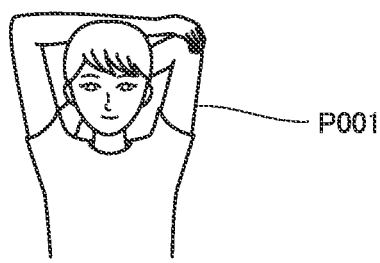
FIGS. 2 and 3 each show a part of representation shown in FIG. 1.

An embodiment of an image display system will hereinafter be described with reference to the drawings. A component having the same function and effect in the description below has the same reference character allotted throughout the drawings and redundant description will not be repeated.

[Overview of Control of Image Display System]

Overview of control of display in the image display system will initially be described.

FIG. 1 shows the image display system including an information processing apparatus 10, a stationary display 20, and a portable operation terminal 6. Display 20 represents one example of a stationary display apparatus. Operation terminal 6 includes a camera (a camera 66 which will be described later) and can communicate with information processing apparatus 10. Information processing apparatus 10 has an image displayed on display 20. Operation terminal 6 displays an image in coordination with an image displayed on display 20 (an image for display) together with an image shot by the camera.

In the present embodiment, an image IMG001 representing one example of an image displayed on display 20 (an image for display) is a motion picture showing scenes in which an instructor does stretch exercises. Namely, IMG001 includes an image of the instructor who is doing stretch exercises.

An image IMG002 representing one example of an image displayed on operation terminal 6 includes an image shot by the camera and an image representing a silhouette of a stretch operation displayed by means of information processing apparatus 10. Such a silhouette image may herein be called a "comparison image".

In FIG. 1, operation terminal 6 shoots a player (a user) A001. FIG. 1 shows a user in the shot image as an object P001 and the silhouette as a silhouette image G001. In the present embodiment, the user included in the shot image as a player represents one example of a subject.

Figure 3:
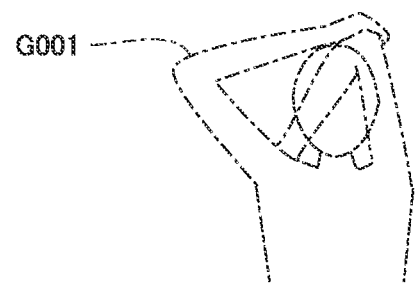

Silhouette image G001 in FIGS. 1 and 3 represents a shadow image in a shape resembling a substance expected as an object (in image IMG002 in FIG. 1, a person).

Operation terminal 6 specifies a position of the subject in the image shot by the camera. Then, operation terminal 6 displays the silhouette image at the specified position. More specifically, operation terminal 6 specifies a position of a specific site (for example, a face) of the subject and displays a silhouette image such that a position corresponding to the specific site in the silhouette image is superimposed on the specific site. Operation terminal 6 adjusts a size of the displayed silhouette image in accordance with a size of the user in the image shot by the camera.

[Configuration of Image Display System]

Figure 4:
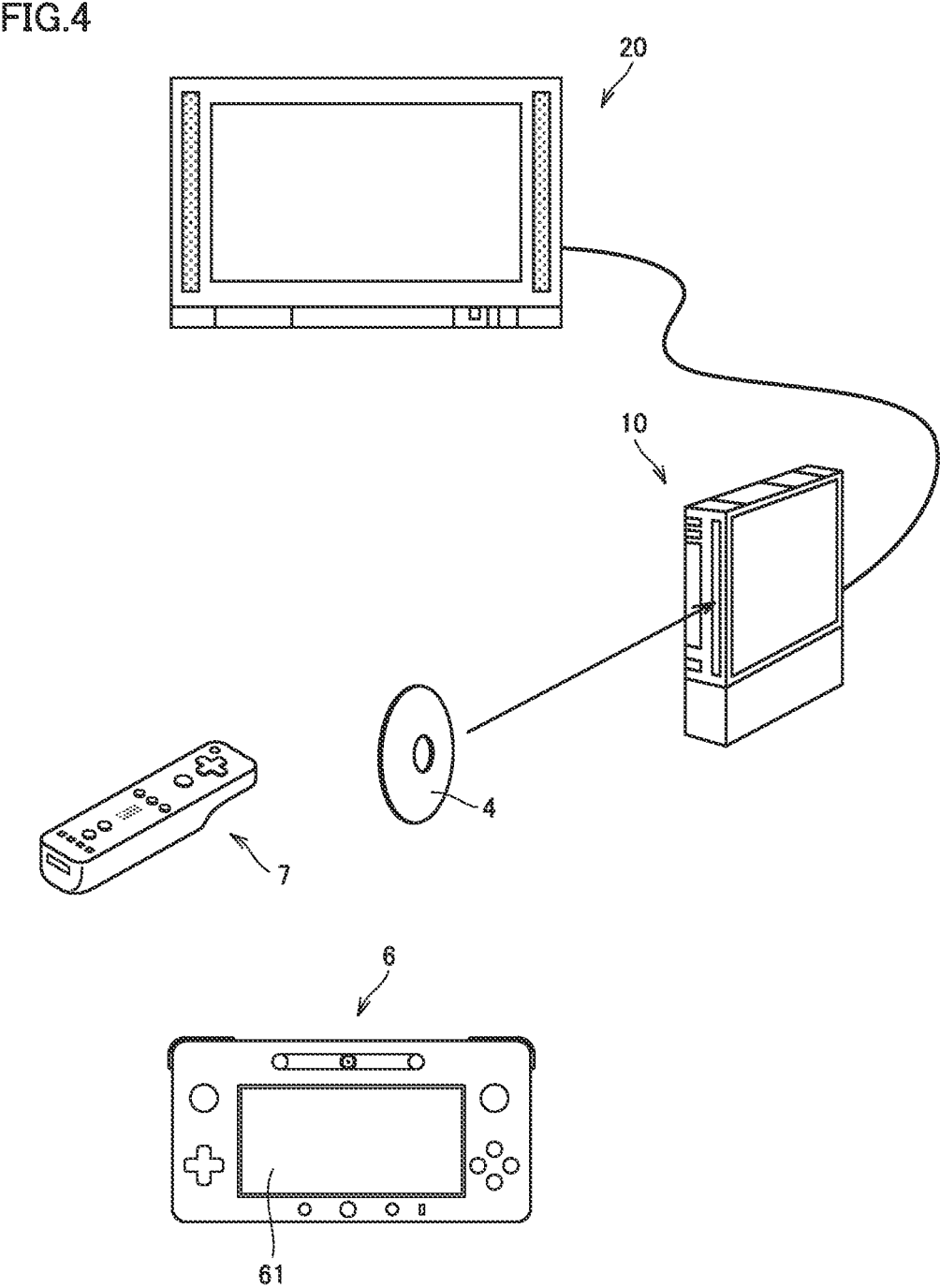
FIG. 4 shows an exemplary illustrative non-limiting schematic diagram illustrating a configuration example of the image display system in the present embodiment.

The image display system shown in FIG. 4 includes information processing apparatus 10, stationary display 20, and operation terminal 6, similarly to the image display system shown in FIG. 1. Information processing apparatus 10 and display 20 are connected to each other via a wire. Operation terminal 6 inputs an instruction to information processing apparatus 10. The image display system further includes an input controller 7. Operation terminal 6 and input controller 7 transmit and receive data to and from information processing apparatus 10 via wireless communication.

In the present example, an optical disc 4 can be inserted in information processing apparatus 10. Optical disc 4 stores a program for performing prescribed information processing. Information processing apparatus 10 reads and executes a program stored in optical disc 4 and performs prescribed information processing through operation terminal 6 and input controller 7.

Though a case that information processing apparatus 10 and display 20 are connected to each other via a wire is described in the present example, wireless communication may be applicable, or data may be transmitted and received between operation terminal 6 and input controller 7, and information processing apparatus 10, via wired connection.

Figure 5:
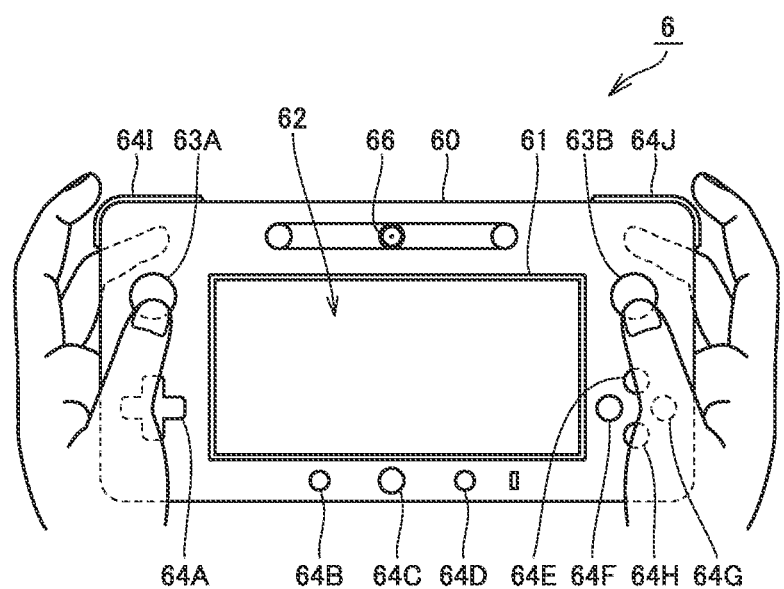
FIG. 5 shows an exemplary illustrative non-limiting schematic diagram illustrating appearance of an operation terminal in the present embodiment.

As shown in FIG. 5, operation terminal 6 includes a housing 60 substantially in a horizontally long rectangular plate shape. Housing 60 has such a size as can be held by a user. Therefore, the user can hold and move operation terminal 6 or change a position of arrangement of operation terminal 6.

Operation terminal 6 has a liquid crystal display (LCD) 61 on a surface of housing 60. LCD 61 is provided around a center of the surface of housing 60. Therefore, the user can also hold and move operation terminal 6 while he/she watches a screen on LCD 61, by holding housing 60 at portions on opposing sides of LCD 61. LCD 61 represents one example of a display portion which displays an image shot in the image display system together with a comparison image.

In the present example, a case that the user holds operation terminal 6 horizontally by holding housing 60 at positions on left and sides of LCD 61 (operation terminal 6 is held with its long-side direction extending horizontally) is shown. Operation terminal 6 can also be held vertically (operation terminal 6 is held with its long-side direction extending vertically).

Operation terminal 6 has a touch panel 62 on the screen of LCD 61 as operation means. In the present embodiment, touch panel 62 is a touch panel of a resistive type. Touch panel 62 is not limited to the resistive type, and for example, a touch panel of any type such as a capacitive type can be employed. Touch panel 62 may be adapted to a single-touch scheme or a multiple-touch scheme. In the present embodiment, a touch panel substantially equal in resolution (detection accuracy) to LCD 61 is employed as touch panel 62. Touch panel 62 and LCD 61 do not have to be equal to each other in resolution. An input to touch panel 62 is provided normally by using a touch pen, however, an input to touch panel 62 can also be provided by a user's finger, without being limited to the touch pen.

Housing 60 may be provided with an accommodation hole for accommodating the touch pen used for performing an operation onto touch panel 62. Since operation terminal 6 thus has touch panel 62, the user can operate touch panel 62 while he/she moves operation terminal 6. Namely, the user can directly provide an input (through touch panel 62) onto the screen while he/she moves the screen on LCD 61.

Operation terminal 6 includes, as operation means, two analog sticks 63A and 63B and a plurality of operation buttons 64A to 64J. Each of analog sticks 63A and 63B is a device indicating a direction. Each of analog sticks 63A and 63B is configured such that a stick portion operated by a user's finger can slide or tilt in any direction (any angle in up, down, left, right, and diagonal directions) with respect to the surface of housing 60.

Each of operation buttons 64A to 64J is operation means for providing a prescribed input. Each of operation buttons 64A to 64J is provided at a position which can be reached for operation by the user while he/she holds the left and right portions of operation terminal 6. Therefore, the user can readily operate such operation means also when he/she holds and moves operation terminal 6.

Operation terminal 6 has a power button for turning on/off power of operation terminal 6. Operation terminal 6 may have an operation button for turning on/off screen display on LCD 61, an operation button for setting connection (pairing) with information processing apparatus 10, or an operation button for adjusting a sound volume of a speaker.

Operation terminal 6 contains camera 66 serving as image pick-up means. Camera 66 includes an image pick-up element having prescribed resolution (for example, a charge coupled device (CCD) image sensor or a complementary metal oxide semiconductor (CMOS) image sensor) and a lens. For example, camera 66 is provided on the same surface of housing 60 where LCD 61 is located. In this case, camera 66 can pick up an image of a face of a user who looks at representation on LCD 61.

[Configuration of Information Processing Apparatus]

Figure 6:
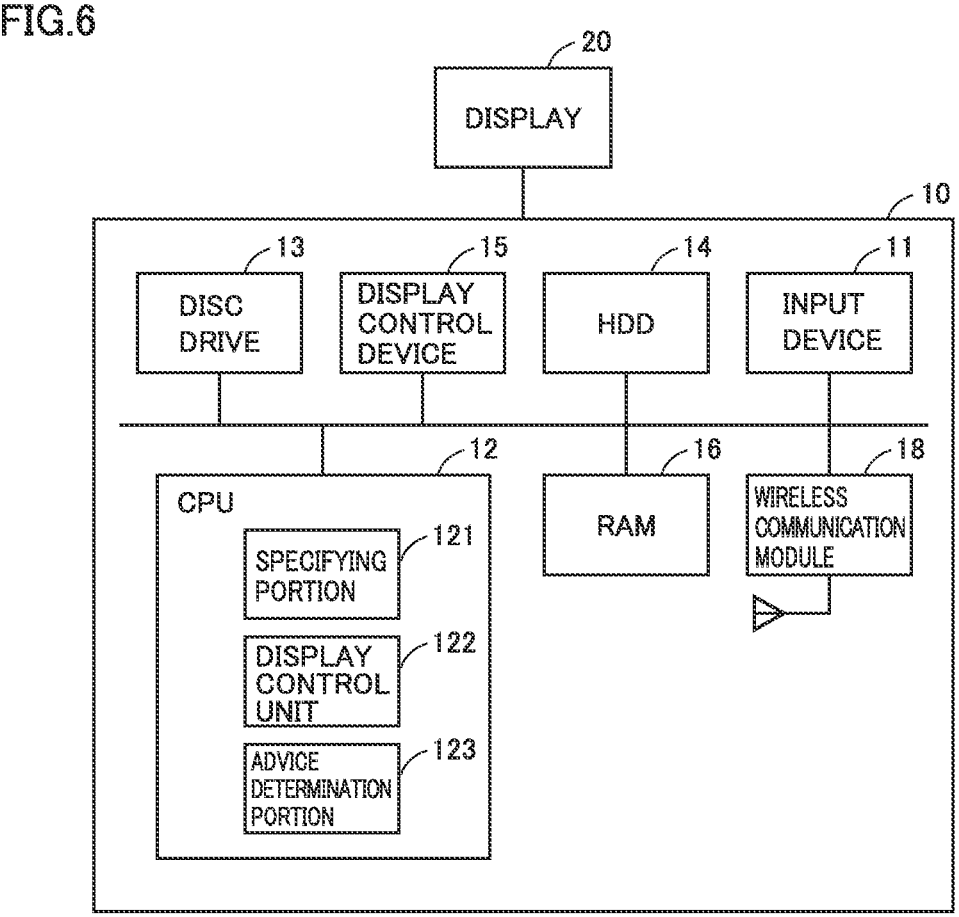
FIG. 6 shows an exemplary illustrative non-limiting schematic diagram illustrating a hardware configuration of an information processing apparatus in the present embodiment.

As shown in FIG. 6, information processing apparatus 10 includes an input device 11, a central processing unit (CPU) 12, a disc drive 13, a hard disk drive (HDD) 14, a display control device 15, a random access memory (RAM) 16, and a wireless communication module 18.

Disc drive 13 drives inserted optical disc 4, reads a program stored in optical disc 4, and outputs the program to CPU 12.

Input device 11 is operated by a user of information processing apparatus 10 and outputs a signal in response to an operation by the user to CPU 12. Input device 11 accepts, for example, an input instruction resulting from an operation by the user onto operation terminal 6 or input controller 7 through wireless communication module 18.

Wireless communication module 18 transmits and receives a signal (data) to and from operation terminal 6 or input controller 7 through wireless communication. Wireless module 18 has a function to connect to wireless local area network (LAN), for example, under a scheme in compliance with IEEE 802.11n specifications. Data transmitted from wireless module 18 may or may not be encrypted as necessary.

Display control device 15 generates an image for display on display 20 in response to an instruction from CPU 12 and outputs the image for display on display 20. Display control device 15 generates an image for display on LCD 61 and transmits the image to operation terminal 6 through wireless communication module 18.

CPU 12 is an operation processing unit for executing a computer program.

HDD 14 stores a system program executed by CPU 12 and various types of data used for execution of the program. The system program executed by CPU 12 may be recorded in advance or obtained from other devices through communication with other devices. A read only memory (ROM) may be employed, without being limited to HDD 14.

RAM 16 temporarily stores a computer program or information as a work area. By way of example, a pseudo-static random access memory (SRAM) can be employed as RAM 16.

CPU 12 functions as a specifying portion 121, a display control unit 122, and an advice determination portion 123 by executing an appropriate program. Specifying portion 121 specifies a position of a user in an image. Display control unit 122 generates an image to be displayed on display 20 by means of information processing apparatus 10. Advice determination portion 123 determines a degree of matching between a position of a user specified by specifying portion 121 and an ideal position of the user.

[Configuration of Operation Terminal]

Figure 7:
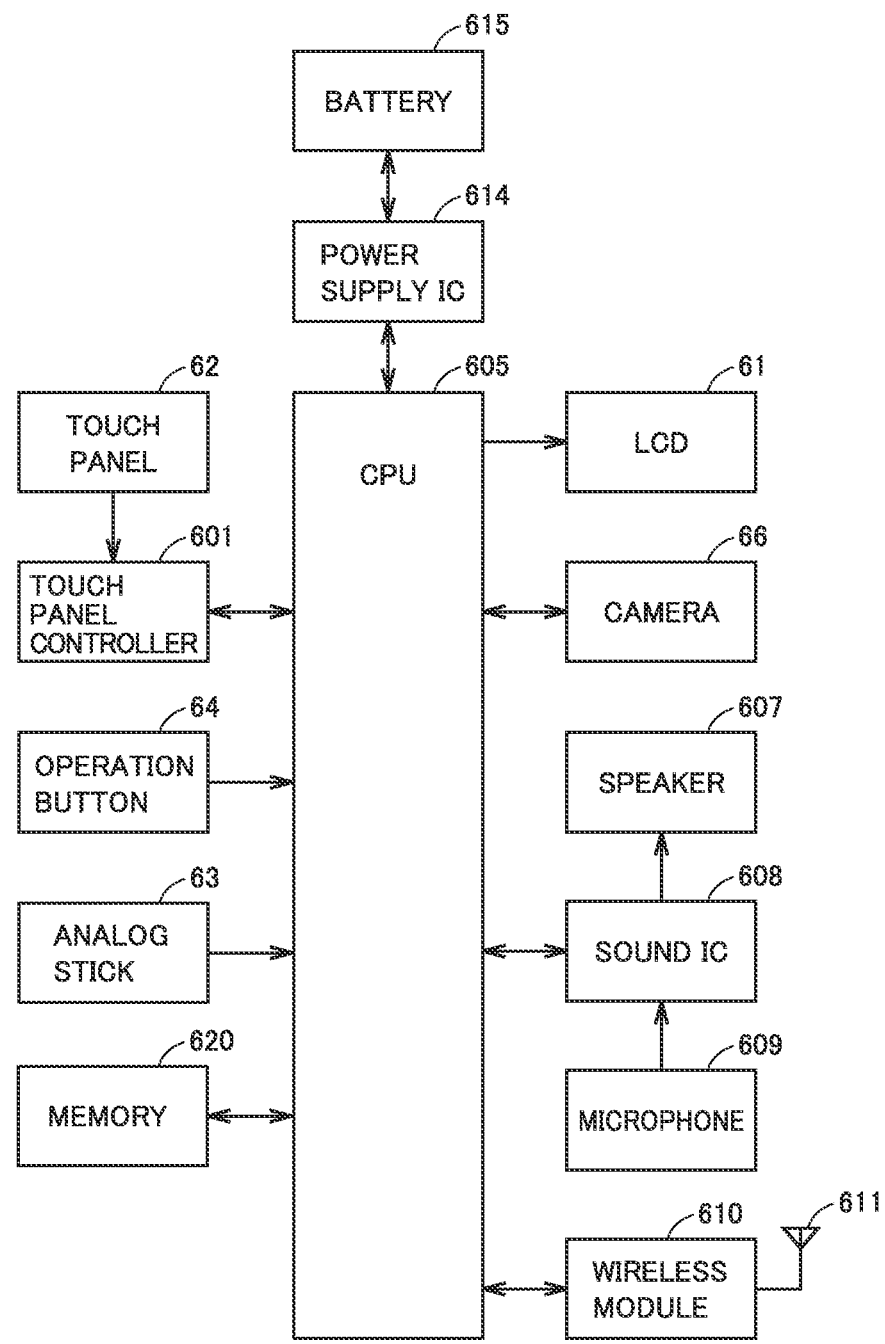
FIG. 7 shows an exemplary illustrative non-limiting schematic diagram illustrating a hardware configuration of the information processing apparatus in the present embodiment.

As shown in FIG. 7, operation terminal 6 includes, in addition to the features shown in FIG. 5, a touch panel controller 601, a CPU 605, a speaker 607, a sound IC 608, a microphone 609, a wireless module 610, an antenna 611, a power supply IC 614, a battery 615, and a memory 620. These electronic components are mounted on an electronic circuit board and accommodated in housing 60.

CPU 605 is a circuit for controlling input and output of data to and from various input and output portions. CPU 605 is connected to touch panel controller 601, analog stick 63 (analog sticks 63A and 63B), operation button 64 (operation buttons 64A to 64J), LCD 61, camera 66, sound IC 608, wireless module 610, and memory 620.

Power supply IC 614 is connected to CPU 605 so that electric power is supplied to each portion. Contained battery 615 is connected to power supply IC 614 so that electric power is supplied. Operation terminal 6 may be charged by attaching operation terminal 6 to a cradle having a not-shown charging function.

Touch panel controller 601 is a circuit connected to touch panel 62 for controlling touch panel 62. Touch panel controller 601 generates touch position data in a prescribed format based on a signal from touch panel 62 and outputs the touch position data to CPU 605. The touch position data represents a coordinate of a position of input provided onto an input surface of touch panel 62. Touch panel controller 601 reads a signal from touch panel 62 and generates touch position data once in a prescribed period of time.

Analog stick 63 outputs stick data representing a direction and an amount of sliding or tilt of a stick portion operated by a user's finger to CPU 605. Operation button 64 outputs operation button data representing a status of input onto operation buttons 64A to 64J (whether an operation button has been pressed or not) to CPU 605. For example, at least a part of analog stick 63 may be located outside housing 60.

Antenna 611 is connected to wireless module 610. Wireless module 610 transmits aforementioned data to information processing apparatus 10 through antenna 611. Wireless module 610 has a function similar to that of wireless communication module 18 of information processing apparatus 10. Namely, wireless module 610 has a function for connection to wireless LAN, for example, under the scheme in compliance with IEEE 802.11n specifications. Data transmitted from wireless module 610 may or may not be encrypted as necessary.

CPU 605 transmits operation data including touch position data, stick data, and operation button data received from the components above to information processing apparatus 10. CPU 605 receives data transmitted from information processing apparatus 10 and carries out a control instruction on each portion.

Camera 66 picks up an image in response to an instruction from information processing apparatus 10 and outputs data on the picked-up image to CPU 605. CPU 605 outputs to camera 66, a control instruction to camera 66 such as an instruction to pick up an image. Camera 66 can also shoot a motion picture. Namely, camera 66 can also repeatedly output image data to CPU 605 by repeatedly picking up images.

Sound IC 608 is a circuit connected to speaker 607 and microphone 609, for controlling input and output of audio data to and from speaker 607 and microphone 609. Namely, when audio data is received from CPU 605, sound IC 608 outputs an audio signal resulting from D/A conversion of the audio data to speaker 607 and has speaker 607 output sound. Microphone 609 senses sound (voice and sound from a user) propagated to operation terminal 6 and outputs an audio signal expressing the sound to sound IC 608. Sound IC 608 subjects an audio signal from microphone 609 to A/D conversion and outputs audio data in a prescribed format to CPU 605.

CPU 605 transmits image data from camera 66, audio data from microphone 609, and operation data to information processing apparatus 10 as terminal operation data through wireless module 610. CPU 605 subjects the terminal operation data to known compression processing for reduction in amount of data, and outputs the compressed transmission data to wireless module 610.

As set forth above, transmission data transmitted from operation terminal 6 to information processing apparatus 10 can include operation data (terminal operation data), image data, and audio data, however, only operation data (terminal operation data) may be included.

Compressed image data and audio data are transmitted from information processing apparatus 10 to operation terminal 6. Such data is received by CPU 605 through antenna 611 and wireless module 610. Then, CPU 605 decompresses the received image data and audio data. The decompressed image data is output to LCD 61, and an image in accordance with the image data is displayed on LCD 61. The decompressed audio data is output to sound IC 608, and sound in accordance with the audio data is output from speaker 607.

When data received from information processing apparatus 10 includes control data, a control instruction in accordance with the control data is carried out in each portion.

As set forth above, though operation terminal 6 includes such operation means as touch panel 62, analog stick 63, and operation button 64, other operation means may be included instead of or in addition to such operation means in other embodiments. For example, a sensor for calculating motion (including a position, a posture, or change in position or posture) (a magnetic sensor, an acceleration sensor, or a gyro sensor) may be provided so that operation means making use of the motion is provided.

Memory 620 includes a non-volatile memory. Memory 620 stores, for example, a program executed by CPU 605 and data necessary for execution of the program.

[Flow of Processing]

One example of a flow of image display processing in the image display system in the present embodiment will be described below. In one example of the image display processing performed in the present embodiment, processing for displaying a motion picture explaining how to do stretch exercises is adopted.

Figure 8:
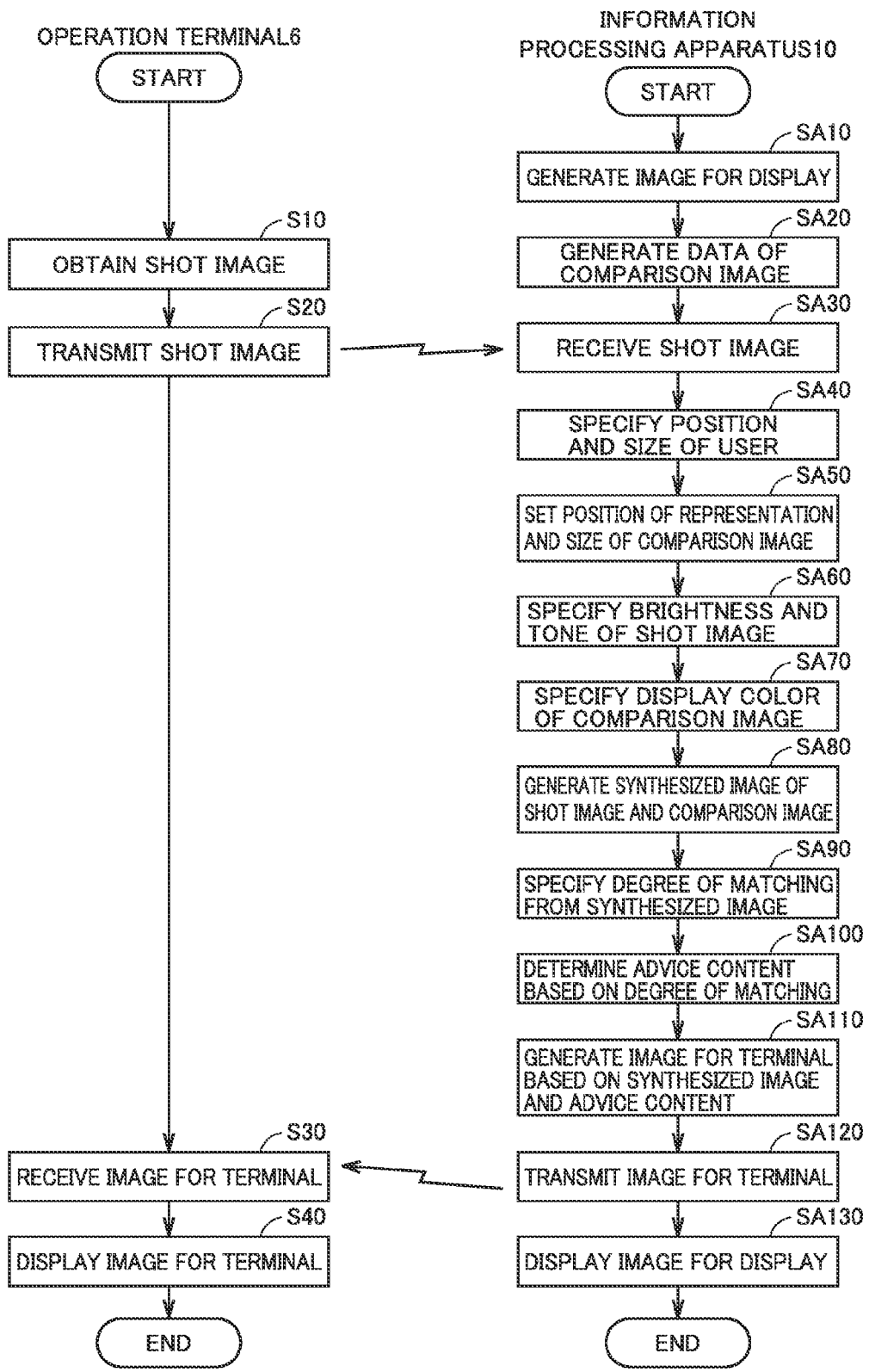
FIG. 8 shows an exemplary illustrative non-limiting flowchart illustrating one example of image display processing performed in the image display system.

In FIG. 8, a flowchart on the right shows processing performed on a side of information processing apparatus 10. A flowchart on the left shows processing performed on a side of operation terminal 6, In the image display system in the present embodiment, a program for performing the image display processing is stored, for example, in optical disc 4 and/or HDD 14. In information processing apparatus 10, CPU 12 reads the program stored in optical disc 4 and/or HDD 14 and performs the processing shown in FIG. 8.

FIGS. 9 to 12 will be referred to as appropriate in the description below.

In the image display system, initially, in step SA10, CPU 12 of information processing apparatus 10 generates an image to be displayed on display 20 (an image for display), for example, in response to an input of an instruction from operation terminal 6 or input controller 7. Then, control proceeds to step SA20.

In step SA20, CPU 12 generates data for operation terminal 6 to display a comparison image. Data for displaying a comparison image may be image data itself of the comparison image, or data designating image data when the image data is stored in memory 620.

The comparison image is exemplified by a good example image like a silhouette image G001 shown in FIGS. 1 and 3. CPU 12 generates a comparison image based on an image generated in step SA10 (the image for display). Thus, the comparison image operates, for example, in coordination with the image for display.

In the present embodiment, the image for display and the comparison image do not necessarily have to operate in coordination. The comparison image is an image corresponding to the image for display. In the present embodiment, the image for display and the comparison image have correspondence as a three-dimensional image and a two-dimensional image of the same stretch operation. In this sense, the image for display represents one example of a "reference image" of the comparison image. Correspondence between the image for display and the comparison image shown in the present embodiment is merely one example of "correspondence".

CPU 605 of operation terminal 6 obtains in step S10, an image shot by camera 66. Then, control proceeds to step S20.

In step S20, CPU 605 transmits the image obtained in step S10 to information processing apparatus 10.

When the shot image is transmitted from operation terminal 6, CPU 12 of information processing apparatus 10 receives the shot image in step SA30. Then, control proceeds to step SA40.

In step SA40, CPU 12 specifies a position and a size of a user in the image shot by camera 66.

Specifying a position and a size of a user is based, for example, on a face recognition technique. More specifically, CPU 12 (specifying portion 121) specifies a position or a region of a face (eyes, nose, mouth, or a contour) of the user in the shot image, and specifies a position of the user in the image based on information on the specified position or the region. More specifically, CPU 12 detects a feature point indicating a portion of the face from a feature value included in the image input from camera 66. The detected feature point includes information on positions of the eyes. Then, CPU 12 specifies the position of the user based on the positions of the eyes. CPU 12 specifies a size of the user in the image based on a distance between recognized two eyes.

A manner of detection of a position and a size of a user described here is merely one example. In the present embodiment, a position and a size of a user in a shot image can be detected in any other known manner.

In order to enhance accuracy in face recognition, operation terminal 6 may shoot an IR image obtained by receiving reflected light resulting from emission of infrared rays to a subject and transmit the IR image to information processing apparatus 10, in addition to a visible light image generated as a result of reception of light in a normal visible light region (hereinafter also referred to as an "RGB image"). Thus, accuracy in face recognition can be enhanced also in face recognition of an image shot in a dark environment.

Then, control proceeds to step SA50.

In step SA50, CPU 12 sets a position and a size of the comparison image based on the position and the size of the user specified in step SA40.

CPU 12 adjusts a position of the comparison image such that the comparison image is superimposed on the user in the image shot by camera 66. More specifically, CPU 12 adjusts a position of the comparison image, for example, such that the user's eyes in the image shot by camera 66 are superimposed on eyes of a person who shows a good example in the comparison image, which corresponds to superimposition of silhouette image G001 on object P001 in image IMG002 in FIG. 1.

CPU 12 adjusts a size of the comparison image in accordance with a size of the user in the image shot by camera 66. Specifically, for example, CPU 12 specifies an interval between both eyes of the user in the image shot by camera 66 and determines a size of the comparison image in correspondence with the specified interval, which corresponds display of silhouette image G001 and object P001 in substantially the same size in image IMG002 in FIG. 1.

CPU 12 preferably determines an image for a comparison image such that the comparison image increases in size as the face of the user increases in size in the image shot as above. Namely, for example, when object P001 in image IMG002 in FIG. 1 increases in size as shown as an object P001A in FIG. 9, a silhouette image G001A is also displayed to be greater than silhouette image G001 in FIG. 1 accordingly, as shown as silhouette image G001A in FIG. 9.

A size of the user in the image shot by camera 66 can also be set in a manner different from the manner described in connection with step SA40. In one example of other manners, a size of the face (for example, a maximum width of the contour of the face) is specified, and a size of the comparison image is set so as to correspond to the specified size (width).

Setting a size of the comparison image in accordance with the size of the user in the shot image in step SA50 may be, for example, adjustment of a length of a prescribed site (an upper arm portion or a forearm portion) in the comparison image to be equal to a length of a corresponding site of the user in the shot image. The comparison image is divided for each site. Namely, in the comparison image, for example, a portion corresponding to the upper arm portion in the comparison image is defined. A site of the user in the shot image is specified, for example, as the image of the user is separated from a background portion of the shot image in accordance with a known method and a joint portion is specified in the separated image of the user.

In step SA50, a position of the comparison image is set in accordance with a position of the user in the image shot by camera 66. Namely, for example, when a position of representation of object P001 in image IMG002 in FIG. 1 moves to the right on LCD 61 as shown as an object P001B in an image IMG102 in FIG. 10, a silhouette image G001B is also displayed as accordingly moved to the right as compared with silhouette image G001 in FIG. 1, as shown as silhouette image G001B in FIG. 10.

Figure 10:
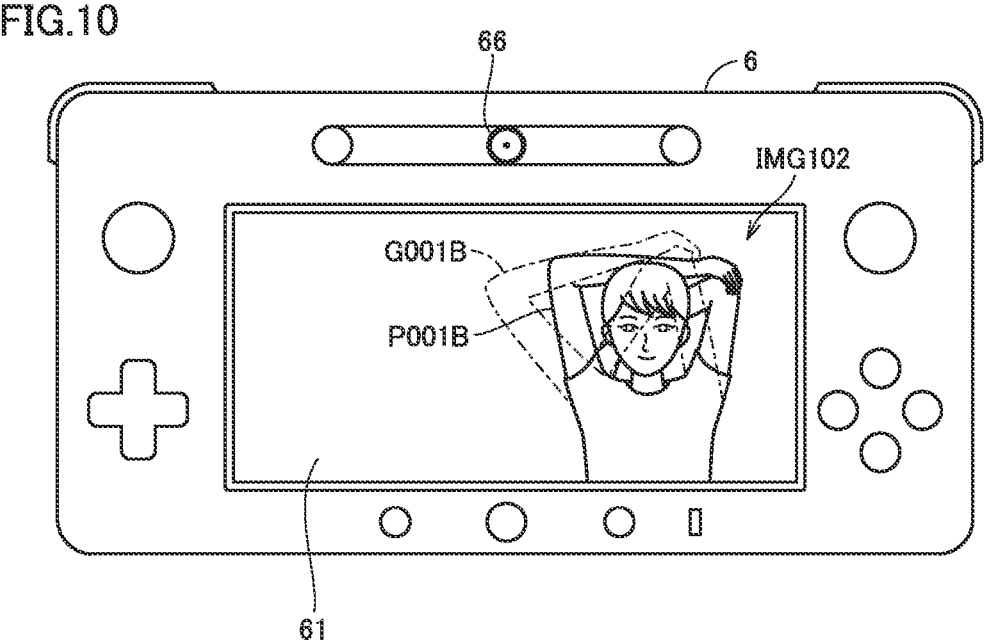

In the state in FIG. 10, the user on which object P001B is based has moved to the right from the state in FIG. 1 when viewed from camera 66. Thus, in the image shot by camera 66, the user moves to the left. On LCD 61, the image shot by camera 66 is displayed in a reversed manner as reflected in the mirror. Thus, in image IMG102 in FIG. 10, the object representing the user has moved to the right as compared with image IMG002 in FIG. 1.

Referring back to FIG. 8, after step SA50, control proceeds to step SA60.

In step SA60, CPU 12 specifies brightness and a tone of the image shot by camera 66. Then, control proceeds to step SA70. A known technique can be made use of for specifying brightness and a tone of an image.

In step SA70, CPU 12 sets a color for displaying the comparison image, in accordance with the brightness and tone specified in step SA60. Then, control proceeds to step SA80.

For setting a color of the comparison image based on brightness of the shot image, for example, when the entire image shot by camera 66 is low in brightness, the color of the comparison image is set to a color high in brightness (white or a light color). More specific description will be given with reference to FIG. 11.

Figure 11:
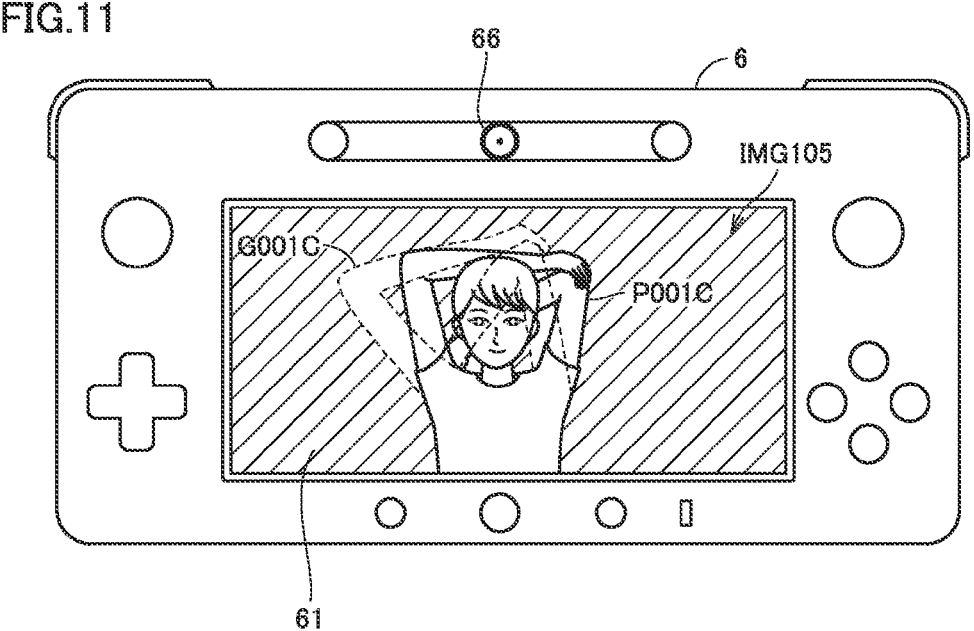

LCD 61 in FIG. 11 displays an image IMG105. Brightness of a location where a user (corresponding to an object P001C in FIG. 11) is located at the time of shooting of image IMG105 is lower than brightness at the time of shooting of image IMG002 in FIG. 1. Namely, the location was darker when image IMG105 was shot than when image IMG002 was shot. In accordance with this fact, a silhouette image G001C in FIG. 11 is displayed in a color higher in brightness than silhouette image G001 in FIG. 1.

In the present embodiment, a reference value for brightness of the entire image is stored, for example, in HDD 14. Then, when brightness specified in step SA60 is higher than the reference value, that is, when the shot image is brighter than the reference, CPU 12 sets the color of the comparison image to be darker. Alternatively, when brightness specified in step SA60 is lower than the reference value, that is, when the shot image is darker than the reference, CPU 12 sets the color of the comparison image to be lighter. Thus, contrast becomes sharper between the comparison image and a portion other than that in the image displayed on LCD 61. Therefore, the color of the comparison image is controlled such that the comparison image can more reliably be recognized.

In setting a color of the comparison image based on a tone of the shot image, for example, when a warm color tone is generally dominant in the image shot by camera 66, CPU 12 sets a cold color as a color of the comparison image.

A color of the comparison image may be set based on brightness and/or a tone of a user in the shot image instead of brightness and/or a tone of the shot image. Setting of a color of the comparison image based on brightness of the user in the shot image (more specifically, brightness of a color of clothing of the user) will be described with reference to FIG. 12.

Figure 12:
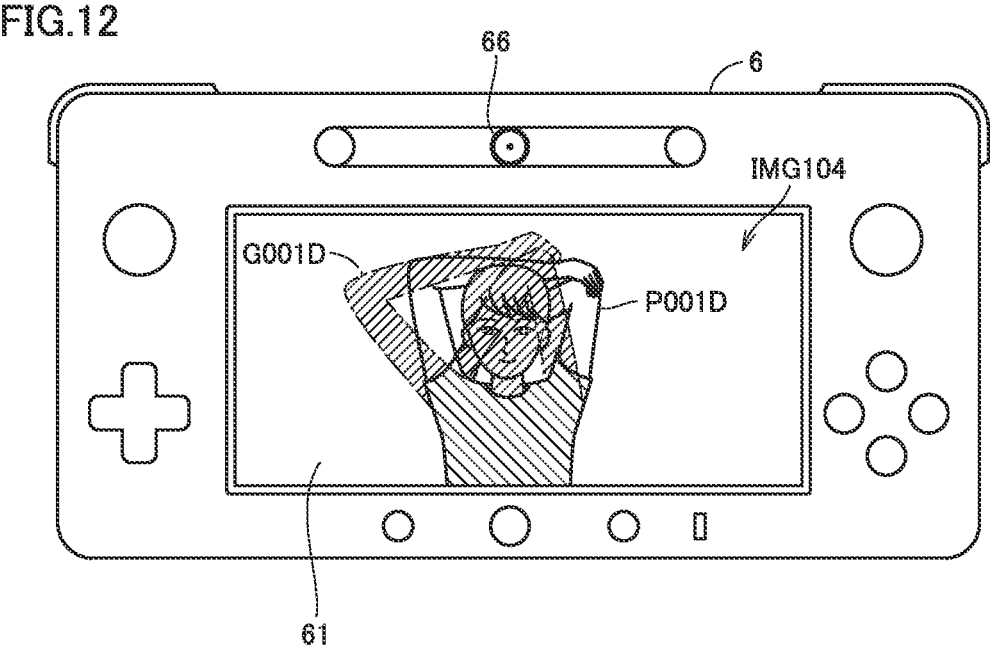

LCD 61 in FIG. 12 displays an image IMG104. When image IMG104 was shot, brightness of (clothing worn by) the user was lower than when image IMG002 in FIG. 1 was shot. Namely, the color of clothing worn by the user (an object P001D) in image IMG104 was darker than the color of clothing worn by the user (object P001) in image IMG002 in FIG. 1. Based on this fact, a silhouette image G001D in image IMG104 in FIG. 12 is displayed in a color higher in brightness than silhouette image G001 in image IMG002 in FIG. 1.

In the example shown in FIG. 12, CPU 605 separates the user from the background of the image shot by camera 66 in step SA60 (see FIG. 8) and specifies brightness of the image of the user. Then, CPU 12 specifies a color of the comparison image in accordance with brightness of the image of the user in step SA70.

For example, HDD 14 stores a reference value for brightness of the user. Then, when brightness specified in step SA60 is higher than the reference value, that is, for example, when the shot user wears clothing in color lighter than the reference, CPU 12 makes the color of the comparison image darker. When brightness specified in step SA60 is lower than the reference value, that is, for example, when the shot user wears clothing in color darker than the reference, CPU 12 makes the color of the comparison image lighter.

Namely, for example, when the user wears a white shirt, the color of the comparison image is set to a relatively intense color (dark red or the like). On the other hand, for example, when the user wears a shirt in rich blue, the color of the comparison image is determined as a light color (light yellow or the like). Thus, contrast can be emphasized between the image of the user and the comparison image in the image displayed on LCD 61.

Relation between a color of the user and a color of the comparison image may be reversed. Namely, when brightness of the color of the user is high, brightness of a display color of the comparison image may be higher, and when brightness of the color of the user is low, brightness of the comparison image may be lowered. Thus, the comparison image does not interfere display of the image of the user as much as possible and the color of the comparison image can be controlled such that the comparison image can sufficiently be recognized.

A color of the comparison image may be fixed. In this case, in the processing shown in FIG. 8, control in step SA60 and step SA70 is omitted.

Referring back to FIG. 8, in step SA80, CPU 12 generates a synthesized image by synthesizing the image shot by camera 66 (the shot image received in step SA30) and the comparison image with each other. The comparison image is arranged at a position determined in step SA50 in a size determined in step SA50. The color of the comparison image has been determined in step SA70. Then, control proceeds to step SA90.

In step SA90, CPU 12 specifies a degree of matching between the comparison image and the user in the image shot by camera 66. The degree is specified, for example, based on a ratio of an area of superimposition between the image of the user in connection with a specific site (the upper arm portion or the forearm portion) and the comparison image in the synthesized image to an area of the corresponding site in the comparison image. Then, control proceeds to step SA100.

In step SA100, CPU 12 specifies an advice content to be output, based on the degree of matching specified in step SA90. HDD 14 stores one or more advice contents in accordance with the degree of matching. More specifically, for example, one example of an advice content corresponding to a degree of matching of 80% or higher is a message "very good posture." One example of an advice content corresponding to a degree of matching not lower than 50% and lower than 80% is a message "keep in there." One example of an advice content corresponding to a degree of matching lower than 50% is a message "check a good example image on the screen." Then, control proceeds to step SA110.

In step SA110, CPU 12 generates an image to be displayed on operation terminal 6 (an image for terminal) based on the synthesized image generated in step SA80 and the advice content specified in step SA100. When the advice includes an image, CPU 12 generates an image for terminal by synthesizing the synthesized image and an image of the advice with each other.

When the advice is given only through voice and sound, that is, when the advice does not include an image, the image for terminal is formed only from the synthesized image. Then, on operation terminal 6, the image for terminal formed only from the synthesized image is reproduced together with voice and sound for advice.

After step SA110, control proceeds to step SA120.

When an oscillator is provided in housing 60, the advice may be output as the oscillator oscillates in a pattern in accordance with an advice content. More specifically, when a program for eye exercises is executed in the image display system and when the user does the exercises while he/she holds housing 60, the user can recognize through oscillation whether or not positions of black eyes successfully move along the reference in the program in the exercises of the user's eyes. In such exercises, positions of black eyes in the user's eyes are specified as the position of the user.

In step SA120, CPU 12 transmits the image for terminal to operation terminal 6. Then, control proceeds to step SA130.

In step SA130, CPU 12 has display 20 display the image for display generated in step SA10, which corresponds to display of image IMG001 by display 20 in FIG. 1.

In step S30, CPU 605 of operation terminal 6 receives the image for terminal transmitted in step SA120. Then, control proceeds to step S40.

In step S40, CPU 605 has LCD 61 display the image for terminal received in step S30.

Then, information processing apparatus 10 and operation terminal 6 terminate the process.

In the processing described with reference to FIG. 8 above, for example, specifying in steps SA40 and SA60 is carried out by specifying portion 121. Determination in steps SA50 and SA70 and generation of a synthesized image in step SA80 or an image for terminal in step SA110 are carried out by display control unit 122. Specifying a degree of matching in step SA90 and determination of an advice content in step SA100 are carried out by advice determination portion 123. Display of an image for terminal in step SA100 is controlled, for example, by display control unit 122, and output of advice is controlled by advice determination portion 123.

The processing in FIG. 8 is repeated once in a prescribed period of time (for example, 1/60 second) (1 cycle). Operation terminal 6 performs the processing in FIG. 8 for each of repeatedly obtained images, so as to be able to change a manner of representation of the comparison image in accordance with change over time in state of the user (a position or a size) in the image shot by camera 66.

[Modification]

(Image Display Apparatus)

In the present embodiment, operation terminal 6 displaying an image shot by camera 66 on LCD 61 together with a comparison image implements an image display apparatus. In the image display system in the present embodiment, an image displayed on operation terminal 6 (a synthesized image or an image for terminal) is generated by information processing apparatus 10. The image may be generated by operation terminal 6. Namely, control in step SA40 to step SA110 may be carried out by CPU 605 of operation terminal 6.

(Position of User)

In the present embodiment, a position of the user is specified by detecting a feature point in a face of the user. A method of specifying a position of the user is not limited as such. For example, when the user does exercises with a marker being attached, a position of the user can be specified based on a position of the marker in an image.

(Position of Comparison Image)

In the present embodiment, on operation terminal 6, a comparison image is displayed as being superimposed on the user in the image shot by camera 66. When a position of the user is varied in the image shot by camera 66 (see FIGS. 1 and 10), a position of representation of the comparison image is varied in accordance with the position of the user. A manner of representation of the image shot by camera 66 may be controlled such that a position of representation of the user is varied in accordance with a position of representation of the comparison image without moving the position of representation of the comparison image.

(Size of Comparison Image)

Figure 9:
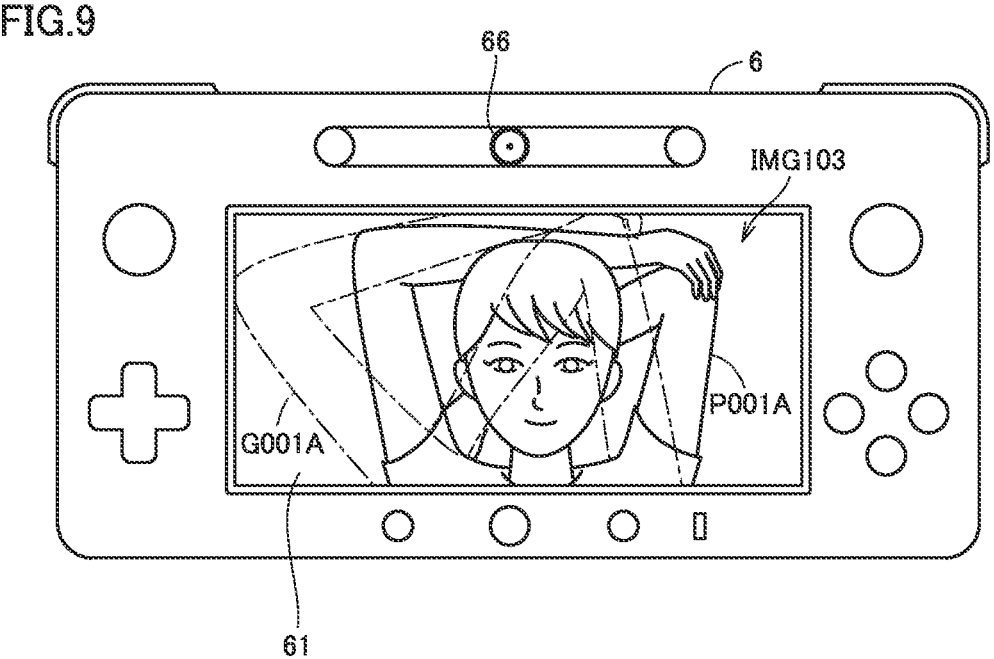
FIGS. 9 to 14 show exemplary illustrative non-limiting diagrams illustrating examples of images displayed in the image display system.

In the present embodiment, a size of a displayed comparison image is controlled in accordance with a size of the user in the image displayed on LCD 61 (see FIGS. 1 and 9). A size of the comparison image may be varied based on another factor. For example, a size of a displayed comparison image may be varied in accordance with a degree of matching between an image of a portion corresponding to the user and the comparison image which is specified in step SA90. More specifically, for example, as the degree of matching is lower, the comparison image is displayed in a larger size. Thus, when the degree of matching is lower, a good example can more reliably be shown to the user.

(Representation of Comparison Image)

In the present embodiment, other than a lateral position and a size of a user, a manner of representation of the comparison image may be varied in accordance with an angle of the user. More specifically, CPU 605 further specifies in step SA40, an angle in a direction in which the user faces with respect to the direction in which LCD 61 faces. Then, CPU 12 varies an angle of the comparison image in accordance with the specified angle.

More specifically, for example, HDD 14 saves an image (a reference image) obtained while the user faces camera 66 (and LCD 61) (the user is right in front of camera 66). CPU 605 specifies a range of the face of the user in the image shot by camera 66 by specifying a flesh-color region including eyes. Then, CPU 12 specifies in step SA40, positions of eyes in the face of the user in the shot image. Then, how much the direction in which the user faces is displaced from the direction in which LCD 61 (camera 66) faces is specified based on a degree of deviation of specified positions of the eyes to the left or right as compared with the position in the reference image. Then, CPU 12 has the comparison image displayed as turned by a degree (an angle) the same as the degree (angle) of specified deviation.

Figure 13:
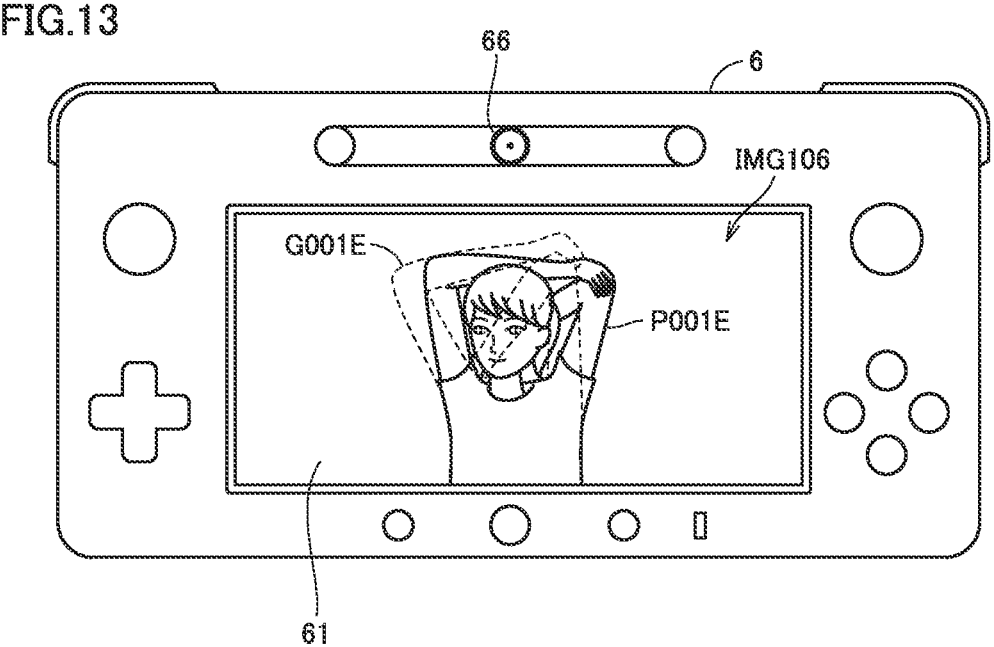

FIG. 13 shows a state that an angle of representation of the comparison image has been varied in accordance with an angle of the user. In an image IMG106 displayed on LCD 61 in FIG. 13, the user faces to the left as shown with an object P001E. Accordingly, a silhouette image G001E is also displayed as turned to the left.

(Camera 66)

In the present embodiment, operation terminal 6 which displays an image such as image IMG002 includes also camera 66 which shoots a user. Operation terminal 6 should only be able to obtain at least an image of a user. Namely, operation terminal 6 does not necessarily include camera 66 when an external camera can obtain an image of a user.

(Operation Terminal 6)

In the present embodiment, operation terminal 6 which displays an image such as image IMG002 is a portable, that is, a mobile terminal Operation terminal 6 does not necessarily have to be mobile. Being mobile, however, operation terminal 6 can display an image in the vicinity of a user who does exercises.

(Representation on Display 20)

Display 20 in the present embodiment displays an image such as a good example image of exercises like image IMG001 (see FIG. 1). A comparison image displayed on LCD 61 corresponds, for example, to an image displayed on display 20. Namely, a silhouette image representing the same pose as a three-dimensional image of a stretch pose displayed on display 20 represents one example of the comparison image. An image displayed on display 20 is preferably displayed without being in coordination with an image shot by camera 66, that is, independently of the image shot by camera 66. Namely, preferably, a content of an image displayed on display 20 is not affected, for example, by magnitude of a difference between the user in the image shot by camera 66 and the silhouette image. An image displayed on display 20 is preferably displayed as a three-dimensional image. The user can thus more reliably and clearly understand a content of an image provided as a result of execution of a program, such as a good example image. CPU 12 of information processing apparatus 10 generates information (image data) for having display 20 display the three-dimensional image.

(Degree of Matching)

In the present embodiment, a degree of matching specified in step SA90 is calculated as a ratio of an area of matching with an image of a user in a comparison image to the total area of the comparison image. In another example of a method of calculating a degree of matching, for example, an angle of a site of a body of the user (for example, an angle of the upper arm) in the image shot by camera 66 is specified based on pattern recognition. Then, a difference between the specified angle and a reference value for an angle of the site set in the comparison image is specified. Then, the degree of matching is specified based on magnitude of the specified difference.

(Guide Display)

In the present embodiment, advice displayed in step SA110 (FIG. 8) may be text information (message) or an image.

An advice content is generated based on a position of the user and a position of the comparison image.

More specifically, CPU 12 specifies a position of a feature point (for example, eyes and an elbow) of the user in the image shot by camera 66. Then, CPU 12 specifies a position of the user based on positions of the eyes and specifies a position of representation of the comparison image based on that position.

Furthermore, CPU 12 specifies a position of the elbow in the comparison image based on the specified position in the comparison image. Then, CPU 12 compares the position of the elbow in the comparison image with a position of the elbow of the user in the image shot by camera 66. Then, CPU 12 generates an advice content in accordance with positional relation between the position of the elbow in the comparison image and the position of the elbow of the user in step SA100. Then, CPU 12 has the generated advice content displayed in step SA110.

Figure 14:
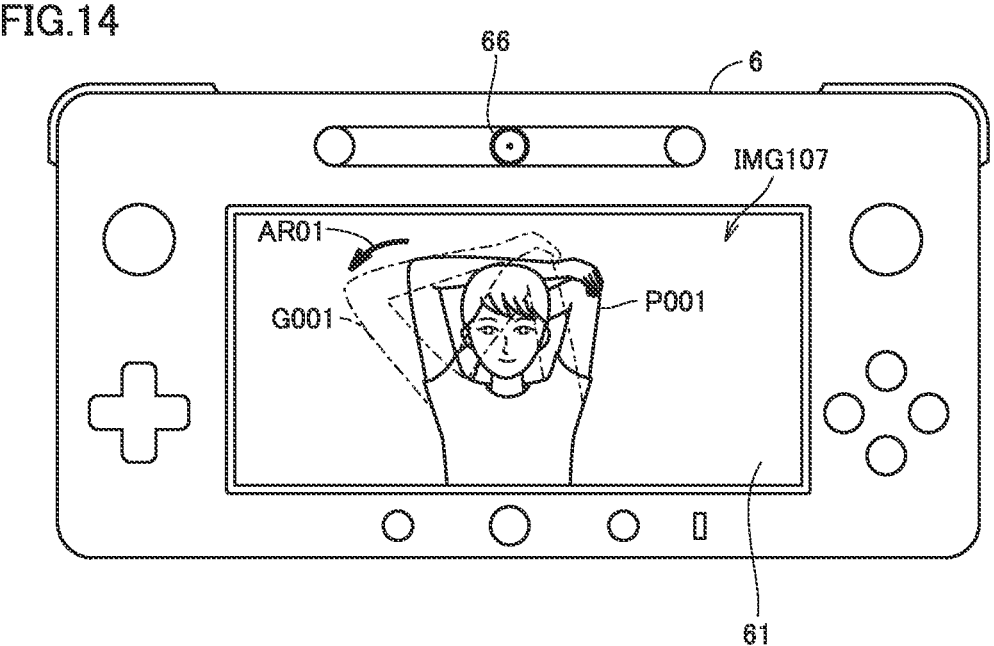

FIG. 14 shows a representation example when displayed advice is an image. An image IMG107 in FIG. 14 includes an arrow AR01 as compared with image IMG002 in FIG. 1. Arrow AR01 extends from the position of the elbow of the user to the position of the elbow in the comparison image. Namely, arrow AR01 leads the position of the elbow of the user to the position of the elbow in the comparison image. As the advice is displayed as an image like arrow AR01, the user can more intuitively visually recognize the difference between the pose of the user and the good example pose (comparison image).

(Program)

A program for implementing control contents in the present embodiment may be provided as an application which can be executed on a personal computer or as being incorporated as a partial function in various applications executed on a personal computer. Each program may be stored in a storage medium alone or with another program, or may be provided via a communication line independently of hardware resources such as a personal computer.

A program for implementing control contents in the present embodiment may be executed as a plurality of apparatuses cooperate with one another as in cloud computing.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An image display system, comprising:
a display unit;
a shooting unit configured to shoot an image of a subject;
a specifying unit configured to specify a position of the subject in the image shot by the shooting unit; and
a display control unit configured to have the display unit display the shot image and a predetermined comparison image,
the display control unit being configured to have the comparison image displayed at a position where the comparison image is superimposed on the subject in the shot image, based on the specified position of the subject.

2. The image display system according to claim 1, wherein the display control unit is configured to vary a size of the comparison image based on a state of the subject in the shot image.

3. The image display system according to claim 2, wherein the specifying unit specifies a size of the subject in the shot image, and
the display control unit is configured to determine a size of the comparison image based on the size of the subject in the shot image.

4. The image display system according to claim 3, wherein the display control unit is configured to set the size of the comparison image such that the comparison image increases in size as the subject in the shot image increases in size.

5. The image display system according to claim 3, wherein the specifying unit specifies a plurality of feature points in the shot image, and
the display control unit is configured to set the size of the comparison image based on the plurality of feature points.

6. The image display system according to claim 1, wherein the shooting unit is configured to repeatedly shoot an image of the subject,
the specifying unit is configured to specify a position of the subject in each of the images repeatedly shot by the shooting unit, and
the display control unit is configured to have the display unit display the images repeatedly shot by the shooting unit and the comparison image.

7. The image display system according to claim 1, wherein the specifying unit is configured to specify a position of a face of the subject in the shot image, and
the display control unit is configured to have the comparison image displayed such that a face in the comparison image is displayed at a position where the face in the comparison image is superimposed on the face of the subject in the shot image, based on the specified position of the face of the subject.

8. The image display system according to claim 7, wherein the specifying unit is configured to specify a feature point in the face of the subject in the shot image, and
the display control unit is configured to have the comparison image displayed such that the face in the comparison image is displayed at a position where the face in the comparison image is superimposed on the face of the subject in the shot image, based on the feature point.

9. The image display system according to claim 1, wherein the shooting unit and the display unit are provided in a common housing.

10. The image display system according to claim 9, wherein
the shooting unit is provided on the same surface where a display surface of the display unit is located.

11. The image display system according to claim 9, wherein
the housing is configured to form a portable terminal.

12. The image display system according to claim 1, wherein
the comparison image is a silhouette image representing a region of the comparison image.

13. The image display system according to claim 1, wherein
the display control unit is further configured to have a reference image displayed, which is an image corresponding to the comparison image.

14. The image display system according to claim 13, wherein
the reference image is a three-dimensional image.

15. The image display system according to claim 13, wherein
the reference image is displayed independently of the shot image.

16. The image display system according to claim 13, further comprising a stationary display apparatus for displaying the reference image.

17. The image display system according to claim 1, wherein
the specifying unit is further configured to specify a portion representing the subject in the shot image, and
the image display system further comprises a determination unit configured to determine a degree of matching between a portion representing the subject in the shot image and the comparison image.

18. The image display system according to claim 17, wherein
the determination unit is configured to calculate the degree based on an area of matching between the portion representing the subject in the shot image and the comparison image.

19. The image display system according to claim 17, wherein
the determination unit is configured to output information based on a difference between the comparison image and the portion representing the subject in the shot image when the degree is lower than a predetermined value.

20. The image display system according to claim 1, wherein
the display control unit is configured to determine a color of the comparison image in accordance with a state of the shot image.

21. The image display system according to claim 20, wherein
the display control unit is configured to determine the color of the comparison image in accordance with brightness of the shot image.

22. An image display apparatus, comprising:
a display unit;
a shooting unit configured to shoot an image of a subject;
a specifying unit configured to specify a position of the subject in the image shot by the shooting unit; and
a display control unit configured to have the display unit display the shot image and a predetermined comparison image,
the comparison image being displayed at a position in the shot image where the comparison image is superimposed on the subject.

23. An image display method, comprising the steps of:
shooting an image of a subject;
specifying a position of the subject in the shot image; and
displaying the shot image and a predetermined comparison image,
the comparison image being arranged at a position in the shot image where the comparison image is superimposed on the subject.

24. A non-transitory storage medium encoded with a computer readable program executed by a computer controlling display of an image on a display unit, the program causing the computer to perform the steps of:
shooting an image of a subject;
specifying a position of the subject in the shot image; and
displaying the shot image and a predetermined comparison image,
the comparison image being arranged at a position in the shot image where the comparison image is superimposed on the subject.

* * * * *